UNITED STATES PATENT OFFICE.

BOTHO SCHWERIN, OF FRANKFORT-ON-THE-MAIN, GERMANY, ASSIGNOR TO GESELLSCHAFT FÜR ELECTRO-OSMOSE M. B. H., OF FRANKFORT-ON-THE-MAIN, GERMANY.

ARTICLE FOR ELECTROLYTICAL PURPOSES.

1,050,303.   Specification of Letters Patent.   Patented Jan. 14, 1913.

No Drawing. Original application filed February 17, 1911, Serial No. 609,148. Divided and this application filed June 13, 1912. Serial No. 703,473.

*To all whom it may concern:*

Be it known that I, BOTHO SCHWERIN, a subject of the Emperor of Germany, and resident of Frankfort-on-the-Main, Germany, have invented certain new and useful Improvements in Articles for Electrolytical Purposes, of which the following is a specification.

The invention relates to an improved product or article particularly adapted for electrolytical purposes or for use in chemical or electro-chemical processes, or wherever a refractory, porous material, adapted to resist a high degree of heat or the action of chemical agents is required.

Preferably the improved product is produced by the process described and claimed in an earlier application, Serial Number 609,148, filed February 17, 1911, of which the present case is a division; and which may be briefly described as follows:

If the product is to be made, for example, from carborundum or corundum, the process is carried out as follows: The raw material is finely ground and elutriated. The elutriation is advantageously carried out by suspending the finely ground material in water to which is added a basic substance such as ammonia if the material treated is of an electro-negative character, such as carborundum, for example, or if such material is of an electro-positive character such as corundum, an acid such as acetic acid is added. To the finest particles thus obtained which have been separated from the coarser particles by the elutriation and suspension in the water used for the elutriation and hence obtained in an exceedingly finely divided condition, and in a condition comparable with that of particles of a colloidal nature, enough water is added to produce a paste which can be formed or molded into the desired shape. The articles thus formed or molded are dried and burned to form the desired product. Owing to the finely divided condition of the particles used and their properties, which partake of a colloidal nature, the refractory materials used, such as carborundum or corundum, which in their natural state are not plastic and are incapable of being molded and burned, are rendered capable of being so molded and burned without the addition of any foreign binding medium. In the case of such an oxidizable material as carborundum, the burning is advantageously carried out in a non-oxidizing or reducing atmosphere as an oxidizing fire or an oxidizing current of air would convert a portion of the finely divided carborundum into silicic acid, the presence of which in the final product would render the latter liable to crack or expand. The product or article thus obtained differs from those produced by processes heretofore employed in that the particles thereof are not bound together by melting or fusion, nor by means of a molten binding medium but are formed into a coherent porous mass by being brought into direct contact with one another and by burning. No fusible flux or binding medium is present in the product. It is sometimes advantageous in the manufacture of the material, to employ an unstable or removable binding medium such, for example, as starch, which either disappears in the course of further treatment of the material or is afterward removed. If desired the carborundum, corundum, etc., may be suitably treated to remove any natural impurities contained therein, before molding and burning the article.

Articles made from the material obtained as above described are hard and give a metallic sound when struck. The form and surface thereof are not affected by the burning operation and they may either have a rough or smooth surface or even a reflecting surface imparted thereto by being properly molded. Patterns or ornamentation applied to the articles before drying and burning are not changed by the burning process. As the articles do not contain any foreign matter they have the stability and resistance of the original substance, carborundum or corundum, and may be used for various purposes. In particular diaphragms made from such material are adapted for electrolytical purposes in which there may be an acid at one side of the diaphragm, and on the opposite side thereof an alkaline electrolyte. The material possesses a high degree of porosity and is refractory and unaffected by chemical influence.

Having thus described the invention, what is claimed and desired to be secured by Letters Patent, is:

1. As an article of manufacture, a molded body of naturally non-plastic refractory material made up of particles of a colloidal nature in a porous coherent form, substantially free from impurities and binding media.

2. An article for electrolytical purposes comprising naturally non-plastic refractory material made up of particles of a colloidal nature in a porous coherent and refractory molded form, substantially free from impurities and binding media.

3. A diaphragm for electrolytical purposes comprising a molded article of naturally non-plastic refractory material made up of particles of a colloidal nature, in a porous coherent form, and substantially free from impurities and binding media.

4. An article for electrolytical purposes comprising carborundum in a porous, coherent and refractory molded form, substantially free from impurities and oxidation products.

5. A diaphragm for electrolytical purposes comprising a molded article of carborundum in a porous coherent form, substantially free from impurities and oxidation products.

6. An article for electrolytical purposes comprising carborundum made up of particles of a colloidal nature in a porous coherent and refractory molded form, substantially free from impurities and binding media.

7. A diaphragm for electrolytical purposes comprising a molded article of carborundum made up of particles of a colloidal nature in a porous coherent and refractory molded form, substantially free from impurities and binding media.

In testimony whereof, I affix my signature in presence of two witnesses.

BOTHO SCHWERIN.

Witnesses:
 HENRY HASPER,
 WOLDEMAR HAUPT.